United States Patent
Gauglitz (10) Patent No.: US 10,785,323 B2
(45) Date of Patent: Sep. 22, 2020

(54) USE OF A DYNAMIC GEOFENCE TO CONTROL MEDIA SHARING AND AGGREGATION ASSOCIATED WITH A MOBILE TARGET

(71) Applicant: PicPocket, Inc., Austin, TX (US)

(72) Inventor: Wolfram Gauglitz, Austin, TX (US)

(73) Assignee: PICPOCKET LABS, INC., Austin, TX (US)

(*) Notice: Subject to any disclaimer, the term of this patent is extended or adjusted under 35 U.S.C. 154(b) by 0 days.

(21) Appl. No.: 15/541,693

(22) PCT Filed: Jan. 5, 2016

(86) PCT No.: PCT/US2016/012244
§ 371 (c)(1),
(2) Date: Jul. 5, 2017

(87) PCT Pub. No.: WO2016/112052
PCT Pub. Date: Jul. 14, 2016

(65) Prior Publication Data
US 2018/0007149 A1 Jan. 4, 2018

Related U.S. Application Data

(60) Provisional application No. 62/099,644, filed on Jan. 5, 2015.

(51) Int. Cl.
*H04W 24/00* (2009.01)
*G06F 15/16* (2006.01)
(Continued)

(52) U.S. Cl.
CPC .............. *H04L 67/18* (2013.01); *H04L 67/22* (2013.01); *H04W 4/021* (2013.01)

(58) Field of Classification Search
CPC .......... H04L 67/18; H04L 67/22; H04W 4/021
(Continued)

(56) References Cited

U.S. PATENT DOCUMENTS

| 5,091,780 A | 2/1992 | Pomerleau |
|---|---|---|
| 5,506,644 A | 4/1996 | Suzuki et al. |

(Continued)

FOREIGN PATENT DOCUMENTS

| WO | 2013163746 A1 | 11/2013 |
|---|---|---|
| WO | 2016040680 A1 | 3/2016 |

OTHER PUBLICATIONS

Dean Brust, "Eventbased Photo Sharing Problems and Solution", Discuz! (Aug. 16, 2007), downloaded on Jan. 21, 2016 from http://love51.mdiscuz.com/thread-27390-1-1.html.
(Continued)

*Primary Examiner* — Rafael Pérez-Gutiérrez
*Assistant Examiner* — Mark G. Pannell
(74) *Attorney, Agent, or Firm* — Christopher Paradies; Paradies Law P.A.

(57) ABSTRACT

A method is provided for processing media of a mobile target having a dynamic geofence associated with it. The method includes providing a software application, an instance of which is installed on a memory device on each of a plurality of mobile technology platforms associated with a plurality of users; receiving a request to associate captured media with the target, or to attribute the captured media to one of the plurality of users; determining whether the media was captured within the dynamic geofence; and, if the media was captured within the dynamic geofence, then granting the request, and otherwise denying the request.

18 Claims, 5 Drawing Sheets

(51) Int. Cl.
*G08B 1/08* (2006.01)
*H04L 29/08* (2006.01)
*H04W 4/021* (2018.01)

(58) Field of Classification Search
USPC .................................................. 455/456.3
See application file for complete search history.

(56) References Cited

U.S. PATENT DOCUMENTS

| | | |
|---|---|---|
| 5,666,157 A | 9/1997 | Aviv |
| 5,893,101 A | 4/1999 | Balogh et al. |
| 6,112,207 A | 8/2000 | Nori et al. |
| 6,115,717 A | 9/2000 | Mehrotra et al. |
| 6,208,988 B1 | 3/2001 | Schultz |
| 6,212,527 B1 | 4/2001 | Gustman |
| 6,363,427 B1 | 3/2002 | Teibel et al. |
| 6,366,962 B1 | 4/2002 | Teibel |
| 6,408,301 B1 | 6/2002 | Patton et al. |
| 6,424,370 B1 | 7/2002 | Courtney |
| 6,504,479 B1 | 1/2003 | Lemons et al. |
| 6,504,571 B1 | 1/2003 | Narayanaswami et al. |
| 6,519,629 B2 | 2/2003 | Harvey et al. |
| 6,618,593 B1 | 9/2003 | Drutman et al. |
| 6,628,835 B1 | 9/2003 | Brill et al. |
| 6,646,676 B1 | 11/2003 | DaGraca et al. |
| 6,657,661 B1 | 12/2003 | Cazier |
| 6,715,003 B1 | 3/2004 | Safai et al. |
| 6,873,851 B2 | 3/2005 | Brown et al. |
| 6,970,183 B1 | 11/2005 | Monroe |
| 7,047,202 B2 | 5/2006 | Jaipuria et al. |
| 7,069,308 B2 | 6/2006 | Abrams |
| 7,305,233 B2 | 12/2007 | Paul et al. |
| 7,511,757 B2 | 3/2009 | Mokunaka et al. |
| 8,341,223 B1 | 12/2012 | Patton et al. |
| 8,412,166 B2 | 4/2013 | Ellanti et al. |
| 8,909,391 B1 | 12/2014 | Peeters et al. |
| 2001/0022621 A1 | 9/2001 | Squibbs |
| 2002/0065741 A1 | 5/2002 | Baum |
| 2003/0004916 A1 | 1/2003 | Lewis |
| 2004/0255321 A1 | 12/2004 | Matz |
| 2005/0002648 A1 | 1/2005 | Hoshino et al. |
| 2006/0117010 A1 | 1/2006 | Hakala |
| 2006/0046755 A1 | 3/2006 | Kies |
| 2006/0135140 A1* | 6/2006 | Rothman .............. H04W 88/02 455/418 |
| 2006/0170956 A1 | 8/2006 | Jung et al. |
| 2006/0259493 A1 | 11/2006 | Liang |
| 2006/0270421 A1 | 11/2006 | Phillips et al. |
| 2006/0271691 A1 | 11/2006 | Jacobs et al. |
| 2007/0035612 A1 | 2/2007 | Korneluk et al. |
| 2007/0284474 A1 | 12/2007 | Olson et al. |
| 2007/0286463 A1 | 12/2007 | Ritzau et al. |
| 2007/0291323 A1 | 12/2007 | Roncal |
| 2008/0229248 A1 | 9/2008 | Fagans et al. |
| 2008/0280591 A1* | 11/2008 | Opaluch .............. H04M 11/04 455/410 |
| 2008/0297608 A1* | 12/2008 | Border .............. H04N 1/00204 348/207.11 |
| 2008/0307311 A1 | 12/2008 | Eyal |
| 2008/0318610 A1 | 12/2008 | Bhaskaran et al. |
| 2009/0006185 A1 | 1/2009 | Stinson |
| 2009/0109299 A1 | 4/2009 | Nishiguchi |
| 2009/0144786 A1 | 6/2009 | Branam et al. |
| 2009/0216859 A1 | 8/2009 | Dolling |
| 2009/0248602 A1 | 10/2009 | Frazier |
| 2010/0017126 A1* | 1/2010 | Holcman ............ G08B 21/0227 701/300 |
| 2010/0026802 A1 | 2/2010 | Titus et al. |
| 2010/0029326 A1 | 2/2010 | Bergstrom et al. |
| 2010/0042940 A1 | 2/2010 | Monday et al. |
| 2010/0057555 A1 | 3/2010 | Butterfield et al. |
| 2010/0070758 A1 | 3/2010 | Low et al. |
| 2010/0145905 A1 | 6/2010 | Sepielli |
| 2010/0191728 A1 | 7/2010 | Reilly et al. |
| 2010/0277611 A1 | 11/2010 | Holt et al. |
| 2010/0287611 A1* | 11/2010 | Blom ...................... H04L 63/10 726/21 |
| 2011/0028083 A1 | 2/2011 | Soitis |
| 2011/0029610 A1 | 2/2011 | Chao et al. |
| 2011/0055935 A1 | 3/2011 | Karaoguz et al. |
| 2011/0066366 A1 | 3/2011 | Ellanti et al. |
| 2011/0066743 A1 | 3/2011 | Hurley et al. |
| 2011/0070872 A1 | 3/2011 | Ellanti et al. |
| 2011/0126155 A1 | 5/2011 | Krishnaraj et al. |
| 2011/0161423 A1 | 6/2011 | Pratt et al. |
| 2011/0178811 A1 | 7/2011 | Sheridan |
| 2011/0202430 A1 | 8/2011 | Narayanan et al. |
| 2011/0205399 A1 | 8/2011 | Gao et al. |
| 2012/0001928 A1 | 1/2012 | Sheha et al. |
| 2012/0200703 A1 | 8/2012 | Nadir et al. |
| 2012/0202515 A1 | 8/2012 | Hsu et al. |
| 2012/0271461 A1 | 10/2012 | Spata |
| 2012/0284623 A1 | 11/2012 | Soderstrom |
| 2013/0040660 A1* | 2/2013 | Fisher .................. G06Q 30/02 455/456.1 |
| 2013/0117146 A1 | 5/2013 | Wolfram |
| 2013/0225196 A1* | 8/2013 | James .................. H04W 4/029 455/456.1 |
| 2013/0275505 A1 | 10/2013 | Gauglitz et al. |
| 2013/0324160 A1* | 12/2013 | Sabatellil ............. H04W 4/022 455/456.3 |
| 2014/0014770 A1 | 1/2014 | Teller et al. |
| 2014/0032034 A1 | 1/2014 | Raptopoulos |
| 2014/0095296 A1 | 4/2014 | Angell et al. |
| 2014/0101781 A1* | 4/2014 | Bouknight ............. G06F 21/10 726/28 |
| 2014/0121957 A1 | 5/2014 | Schenken et al. |
| 2014/0155094 A1* | 6/2014 | Zises .................... H04W 4/021 455/456.3 |
| 2014/0164118 A1 | 6/2014 | Polachi |
| 2015/0106950 A1* | 4/2015 | Holman ............. G06F 21/6245 726/26 |
| 2015/0172449 A1* | 6/2015 | Clavenna, II ..... H04M 1/72577 455/418 |
| 2015/0235048 A1* | 8/2015 | Balusu .................... H04W 4/21 348/207.1 |

OTHER PUBLICATIONS

John Biggs, "Plixi, Formerly TweetPhoto, Updated to Offer Location-Based Photo Sharing on the iPhone", TechCrunch.com (Oct. 14, 2010), downloaded on Jun. 17, 2016 from https://techcrunch.com/2010/10/14/plixi-formerly-tweetphoto-updated-to-offer-location-based-photo-sharing-on-the-iphone/.

Robin Wauters, "TweetPhoto Aims to Take on TwitPic by Adding More Features. Will it Stick?" TechCrunch.com (May 4, 2009), downloaded on Jan. 25, 2016 from http://techcrunch.com/2009/05/04/tweetphoto-aims-to-take-on-twitpic-by-adding-more-features-will-it-stick/.

Sarah Perez, "TweetPhoto Becomes Plixi, Presents New Vision for Location-Based Services", ReadWrite.com (Aug. 31, 2010), downloaded on Jan. 25, 2016 from http://readwrite.com/2010/08/31/tweetphoto_becomes_plixi_presents_new_vision_for_l.

\* cited by examiner

USE OF A DYNAMIC GEOFENCE TO CONTROL MEDIA SHARING AND AGGREGATION ASSOCIATED WITH A MOBILE TARGET

CROSS-REFERENCE TO RELATED APPLICATION

This application claims the benefit of priority from U.S. provisional application No. 62/099,644, filed Jan. 5, 2015, having the same inventor, and entitled "SYSTEMS AND METHODOLOGIES FOR UTILIZING A ROAMING GEOFENCE TO CONTROL MEDIA SHARING AND AGGREGATION ASSOCIATED WITH A MOBILE TARGET", and which is incorporated herein by reference in its entirety.

FIELD OF THE DISCLOSURE

The present disclosure relates generally to systems and methods for media sharing, and more particularly to systems and methodologies for controlling media sharing in conjunction with a dynamic geofence or other mobile target.

BACKGROUND OF THE DISCLOSURE

Several systems and methodologies for media sharing have been developed in the art. For example, U.S. 2013/0275505 (Gauglitz et al.), entitled "Systems and Methods for Event Networking and Media Sharing", which is incorporated herein by reference in its entirety, discloses systems and methodologies for aggregating and sharing media associated with events which has been captured by communities of users. Such events may be, for example, sporting events, birthdays, occurrences (such as, for example, a crime), or any other event in which it may be desirable for individuals to aggregate and share media they have captured relating to the event.

SUMMARY OF THE DISCLOSURE

In one aspect, a method is provided for processing captured media of a mobile target having a dynamic geofence associated with it. The method comprises (a) providing a software application, an instance of which is installed on a memory device on each of a plurality of mobile technology platforms associated with a plurality of users; (b) receiving a request to associate captured media with the target or to attribute the captured media to one of the plurality of users; (c) determining whether the media was captured within the dynamic geofence; and (d) if the media was captured within the dynamic geofence, then granting the request, and otherwise denying the request.

In another aspect, a method is provided for controlling the capture of media associated with a mobile target having a dynamic geofence associated with it. The method comprises (a) providing a software application, an instance of which is installed on a memory device on each of a plurality of mobile technology platforms associated with a plurality of users; (b) receiving a request from a mobile technology platform to capture media; (c) determining whether the mobile technology platform is within the dynamic geofence; and (d) if the mobile technology platform is within the dynamic geofence, then granting the request to capture the media, and otherwise denying the request to capture the media.

In a further aspect, a system is provided for processing captured media of a mobile target having a dynamic geofence associated with it. The system comprises (a) a software application, an instance of which is installed on each of a plurality of mobile technology platforms associated with a plurality of users; and (b) at least one server which receives requests from instances of the software disposed on the plurality of mobile technology platforms to associate media captured on the plurality of mobile technology platforms with a target or to attribute the captured media to one of the plurality of users. The at least one server determines whether the media which is the subject of a request was captured within the dynamic geofence associated with the target. If the media was captured within the dynamic geofence associated with the target, the server grants the request, and otherwise denies the request.

In still another aspect, a system is provided for capturing media of a mobile target having a dynamic geofence associated with it. The system comprises (a) a plurality of mobile technology platforms, each associated with a user; (b) a software application, an instance of which is installed on each of said plurality of mobile technology platforms, which establishes a dynamic geofence and an exclusion zone around the host mobile technology platform, and which tracks the current location of the host mobile technology platform; and (c) at least one server which receives requests from instances of the software disposed on the plurality of mobile technology platforms to capture media of the mobile target. The at least one server is configured to determine, from the current location of the requesting mobile technology platform, whether the requesting mobile technology platform is within the exclusion zone of the target, and grants the request if the current location of the requesting mobile technology platform is outside of the exclusion zone of the target, and otherwise denies the request.

In a further aspect, a method for establishing a geofence, comprising (a) establishing a group containing a plurality of members, wherein the location of at least one of said plurality of members changes as a function of time; (b) establishing a group geofence which encompasses each of said plurality of members; and (c) in response to the movement of at least one of said plurality of members, adjusting at least one dimension of the group geofence so that the group geofence continues to encompass each of said plurality of members.

DETAILED DESCRIPTION

While the systems and methodologies disclosed in U.S. 2013/0275505 (Gauglitz et al.) represent significant advances in the art, further improvements in these systems and methodologies are desirable to account for targets or events that are not stationary. For example, in some cases, an event which may give rise to media, and with respect to which it may be desirable to share and aggregate the media, may be a moving target, such as the Weinermobile on a cross-country trip. Similarly, the "event" may be an individual, such as a celebrity. With respect to the latter, it may be equally important to define when media will not be shared and aggregated, so as to respect the personal privacy of the individual.

It has now been found that the foregoing needs may be met with the systems and methodologies disclosed herein. In a preferred embodiment, these systems and methodologies utilize software, an instance of which is installed on each of a plurality of mobile technology platforms associated with each of a plurality of users. The software preferably has the general features of the software disclosed in U.S. 2013/0275505 (Gauglitz et al.), and in addition, has the ability to update a geofence around a user or target with sufficient frequency so as to create a dynamic geofence around the target or geofence. In some embodiments, the systems and software disclosed herein also has the ability to establish an exclusion zone around the target.

The systems and methodologies may be utilized to control the capture of media in the proximity of a target, or to control the sharing of that media, the association of that media with the target, or the attribution of that media to a particular user (or users). These systems and methodologies may thus be used for media sharing and aggregation purposes of the type described in U.S. 2013/0275505 (Gauglitz et al.), while also providing measures which allow for personal privacy and accommodating events whose location may change as a function of time.

Figure 1:
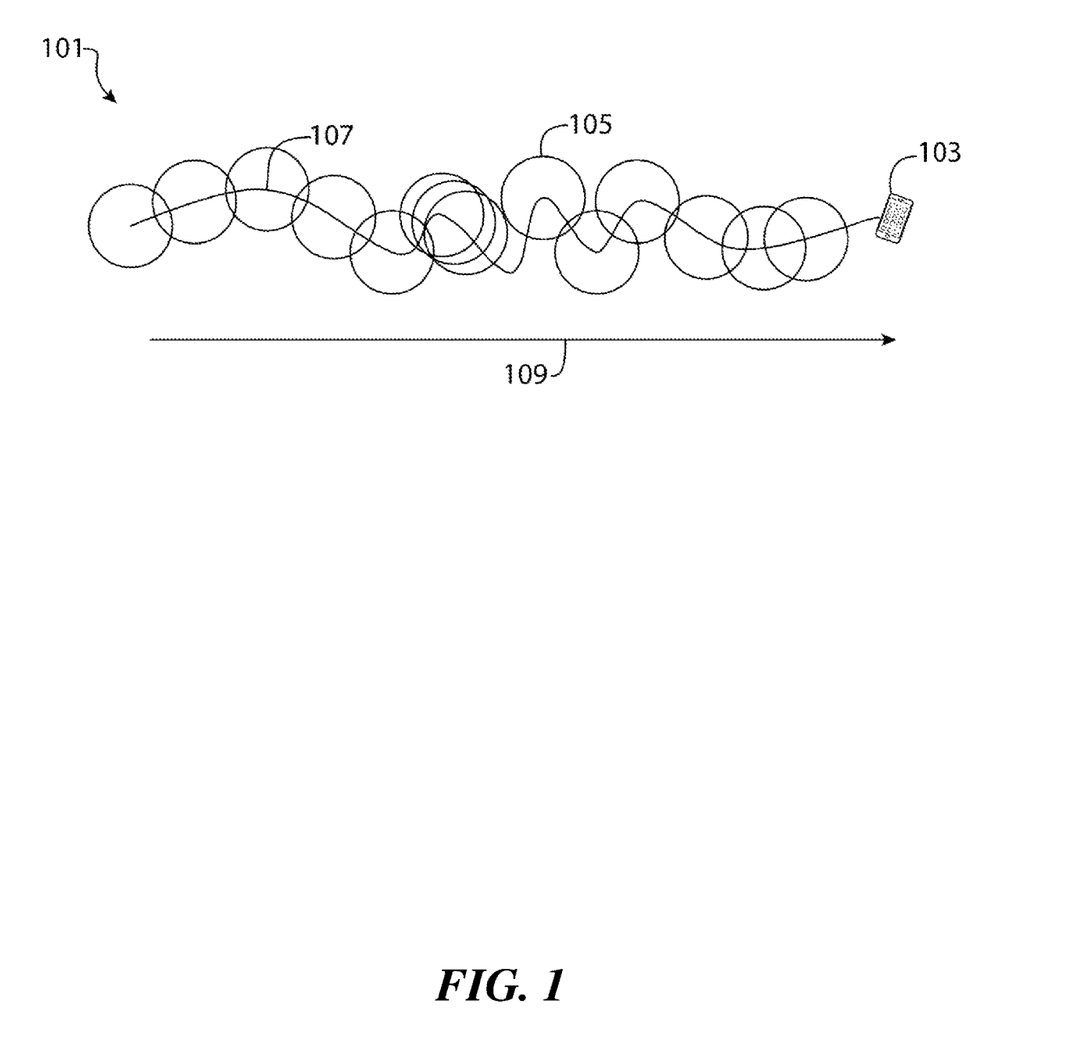
FIG. 1 is an illustration of a system for utilizing a roaming geofence to create a zone around a moving target which controls the sharing and aggregation of media associated with the target.

The systems and methodologies disclosed herein may be further appreciated with respect to the first particular, non-limiting embodiment of a system in accordance with the teachings herein which is depicted in FIG. 1. The system 101 depicted therein includes a mobile technology platform 103 which is associated with a target. The target may be a person, object or event. The mobile technology platform is equipped with a memory device having installed thereon an instance of software of the type disclosed in U.S. 2013/0275505 (Gauglitz et al.). The target, and hence the mobile technology platform, moves along a path 107 as a function of time or another suitable variable as indicated by axis 109.

The software may be a distributed application. Preferably, the software has a front end, instances of which run on a plurality of mobile technology platforms (including the mobile technology platform associated with the target) associated with a plurality of users, and a backend, at least one instance of which runs on at least one server. However, embodiments are also possible in which the software is a stand-alone application, individual instances of which are resident on mobile technology platforms. The software is equipped with location awareness functionality (or is able to access such functionalities from, for example, the operating system of the host device), tracks the current location of, and establishes a dynamic geofence 105 around each mobile technology platform.

As the target moves along the path 103, the software updates its associated geofence with sufficient frequency to effectively maintain a dynamic geofence 105 around the target. The geofence updates may occur, for example, on a periodic basis, or as a function of elapsed time, distance, or the speed or acceleration of the host mobile technology platform. The geofence itself may be defined by a radius, or by a shape (which may be geometric or irregular) which may be predetermined or which may be defined with the software.

When another mobile technology platform enters the dynamic geofence—and has a memory device having installed thereon another instance of software (or, as the case may be, another instance of the frontend of such software)—that mobile technology platform may capture media with the software, and the media may be associated with the target. For example, if the target is a moving target such as the Weinermobile on a cross-country trek, a user of the software may capture video, images or audio tracks of the target. If the user is within the dynamic geofence associated with the target at the time the media was captured (as determined, for example, by comparing the relative geofences of the user and the target at that time), then the captured media may be associated with the target. In some embodiments, the captured media may be posted or streamed to a website or web page associated with the target, or may be viewed on a mobile device or within the mobile application. Consequently, the media captured by the user may be aggregated and shared with other users of the software who are interested in or associated with the target, in the general manner described in U.S. 2013/0275505 (Gauglitz et al.).

Figure 2:
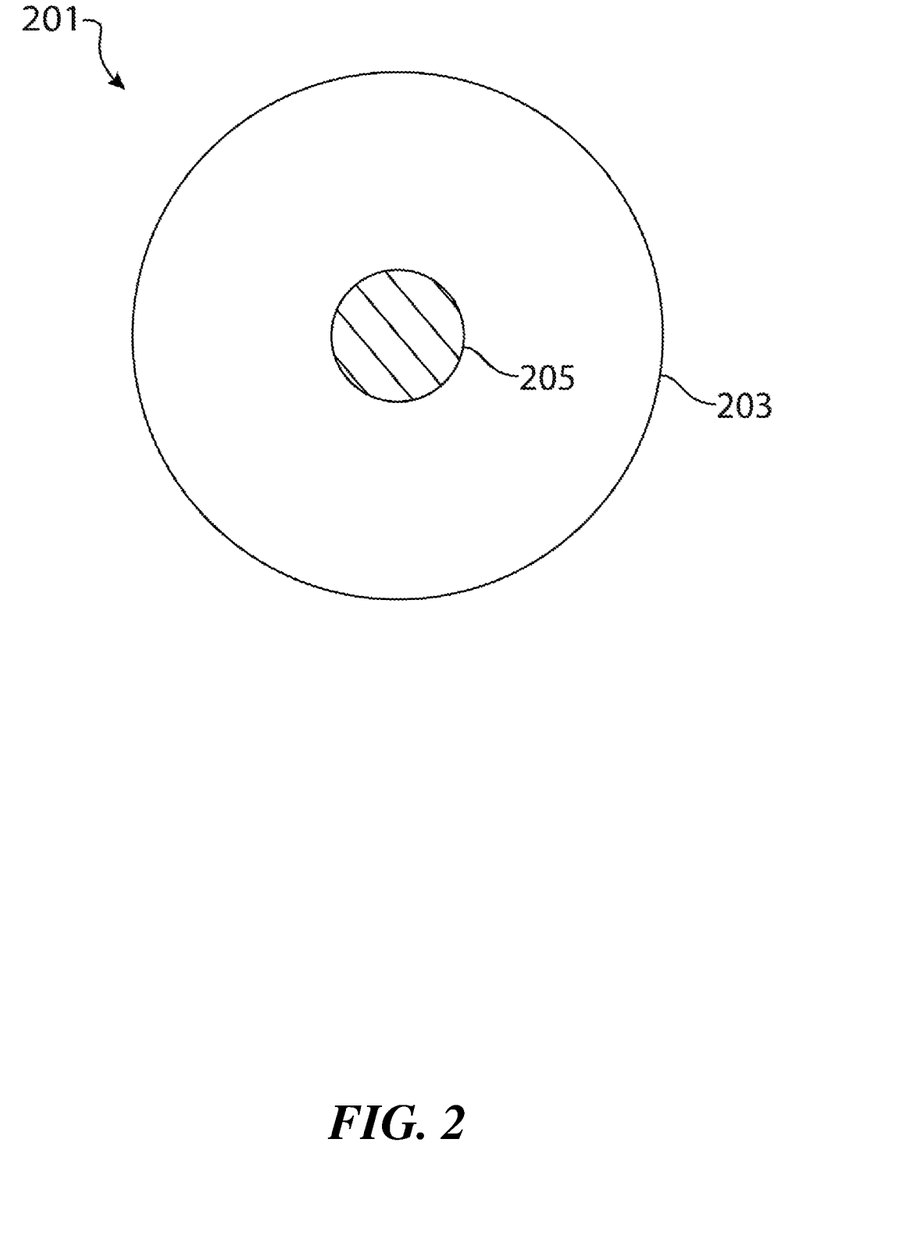
FIG. 2 is an illustration of a system of the type shown in FIG. 1 to establish an exclusion zone for media sharing and aggregation around a moving target.

FIG. 2 depicts a second particular, non-limiting embodiment of a system in accordance with the teachings herein. The system 201 depicted therein comprises a dynamic geofence 203, which is established, and which functions, in a manner similar to the system depicted in FIG. 1. However, the dynamic geofence 203 of FIG. 2 is further equipped with an exclusion zone 205. When another mobile technology platform is within the exclusion zone 205 and is equipped with an instance of the software, the software may preclude that mobile technology platform from acquiring media of the target, from associating any captured media with the target, and/or from attributing any captured media to a particular user.

The embodiment of FIG. 2 is especially useful in conjunction with celebrities. Such persons may, for publicity purposes or other reasons, desire to be featured in media captured by members of the public. For example, such celebrities may be interested in having such captured media posted to or streamed to a website or webpage, or to a mobile device or mobile application, which may be associated with them. At the same time, however, such persons may also desire a modicum of privacy. For example, such persons may desire to control when such media may be captured, or the proximity with which such media may be captured. These objectives may be accomplished by the aforementioned exclusion zone, which may be activated or deactivated by the person at will. Moreover, when active, the parameters (e.g., the radius) of the exclusion zone may be adjusted at will to either prevent such media from being captured in the first place, or to control (at least partially) what may be done with any captured media.

It will be appreciated that members of the public may be properly incentivized to utilize the software described herein and to subject themselves to any restrictions on media capture or association which the software may place on them. For example, in some embodiments, users of the software may be provided with cash or gift incentives for media captured or associated with a target through use of the software. Such incentives may be predicated on the media being attributed to the user. Hence, if the media is captured in a manner which prevents such attribution (e.g., because it was captured in an exclusion zone), then the user loses the benefit of such incentives.

Figure 3:
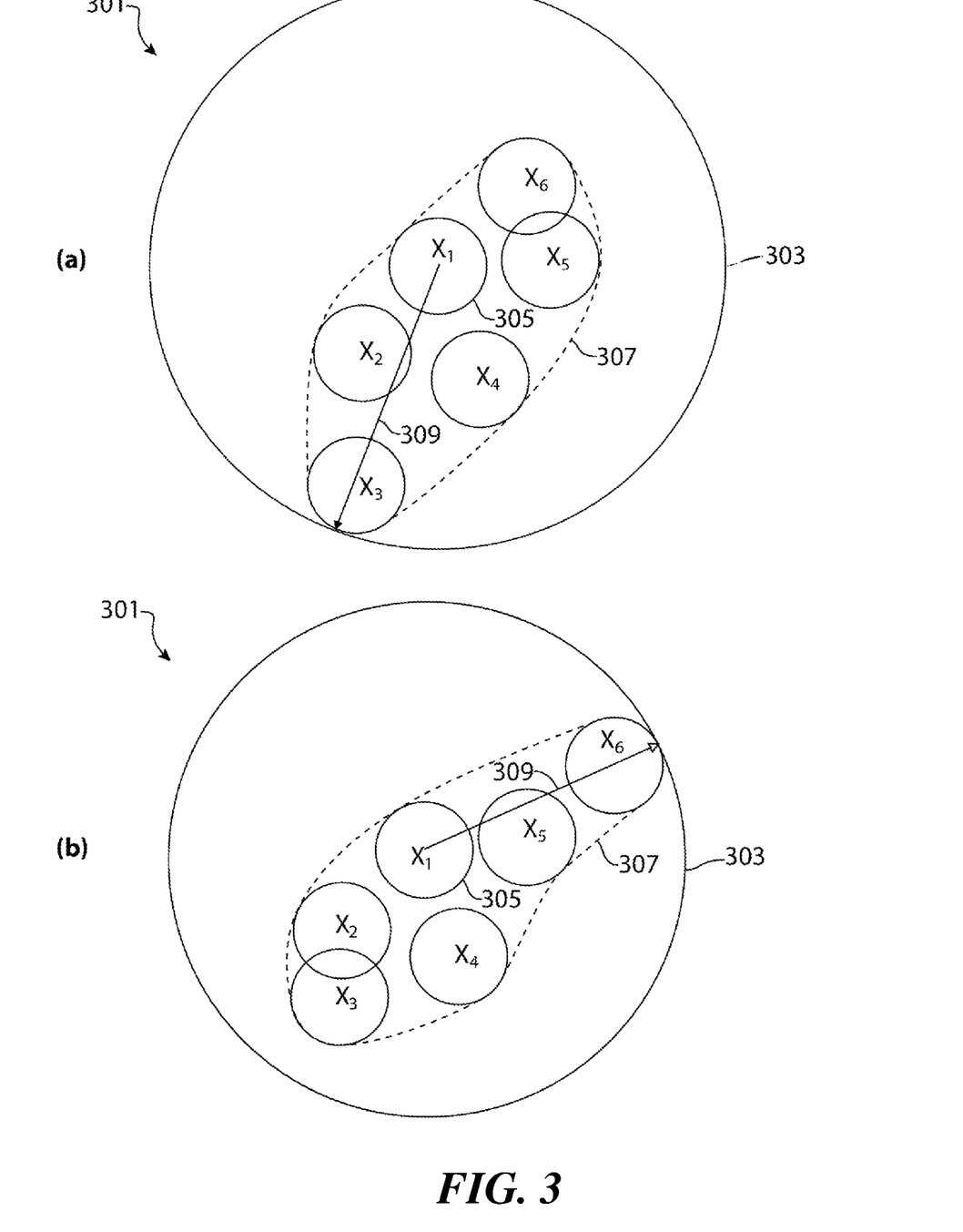
FIGS. 3a-3b are illustrations of a first embodiment of a system for utilizing a dynamic geofence to continuously encompass an entourage.

FIGS. 3a-3b are illustrations of a first embodiment of a system 301 for utilizing a dynamic geofence 303 of fixed shape to create a media sharing zone which adapts to continuously encompass all of the members 305 of an entourage disposed within envelope 307. The entourage may be, for example, an assembly of individuals. However, as noted below, in some embodiments, the entourage may also include places or things, each of which may be treated as a member or host of the party.

The geofence 303 in this particular embodiment has a fixed shape (a circle) and remains centered at all times on a designated host ($X_1$). However, the size of the geofence adapts dynamically to continually encompass the entourage. For example, if the geofence is circular in shape with the host located at its center (as in the embodiment depicted), the radius 309 of the geofence may expand and contract as necessary to ensure that all members 305 of the entourage are continuously encompassed by the geofence. This may be accomplished, for example, by determining the member of the entourage ($X_3$ in FIG. 3a, and $X_6$ in FIG. 3b) which, at a given time, is farthest from the host, and adjusting the radius 309 of the geofence to encompass that member.

Figure 4:
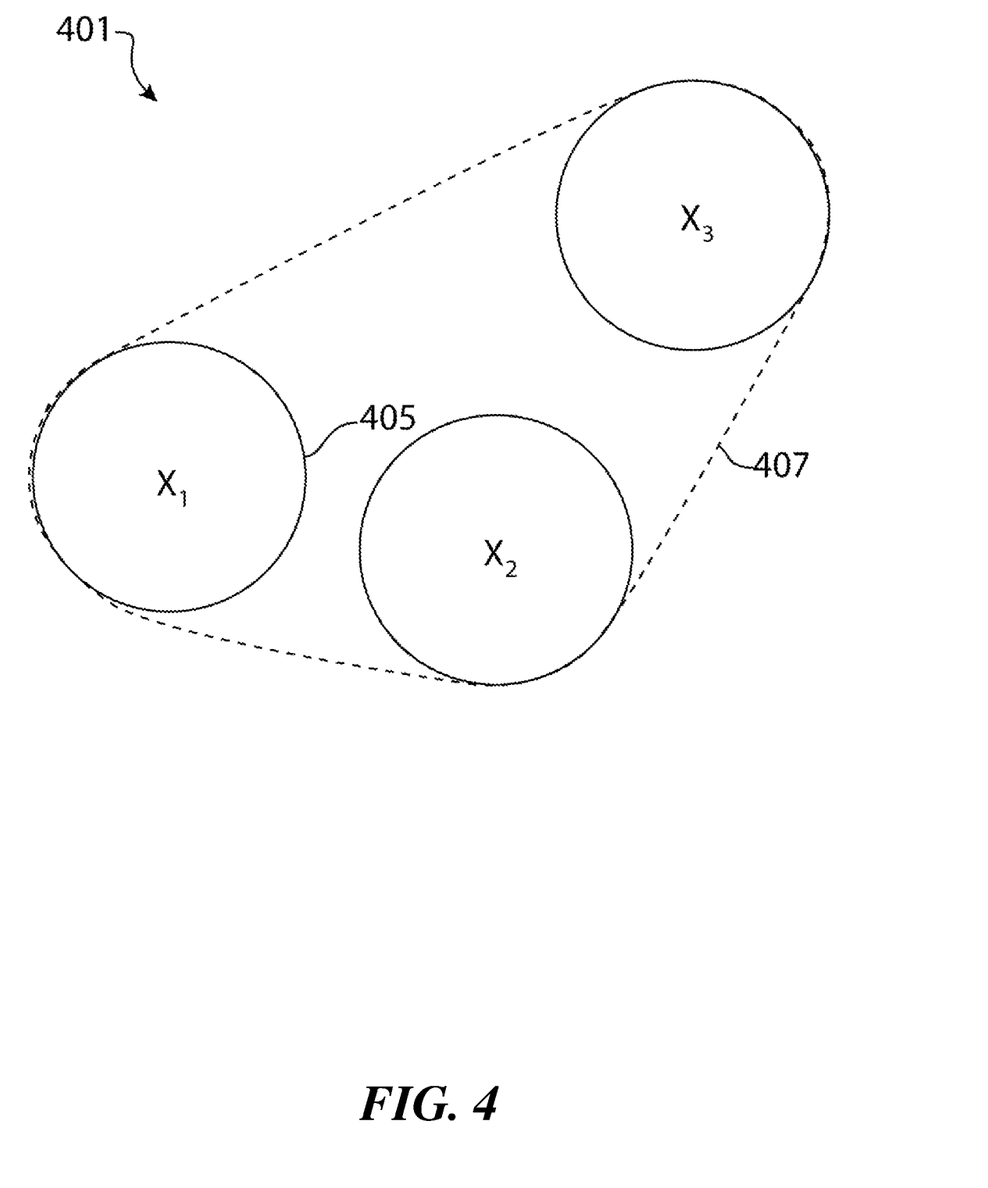
FIG. 4 is an illustration of a second embodiment of a system for utilizing a dynamic geofence to create a zone which adapts to continuously encompass an entourage.
Figure 5:
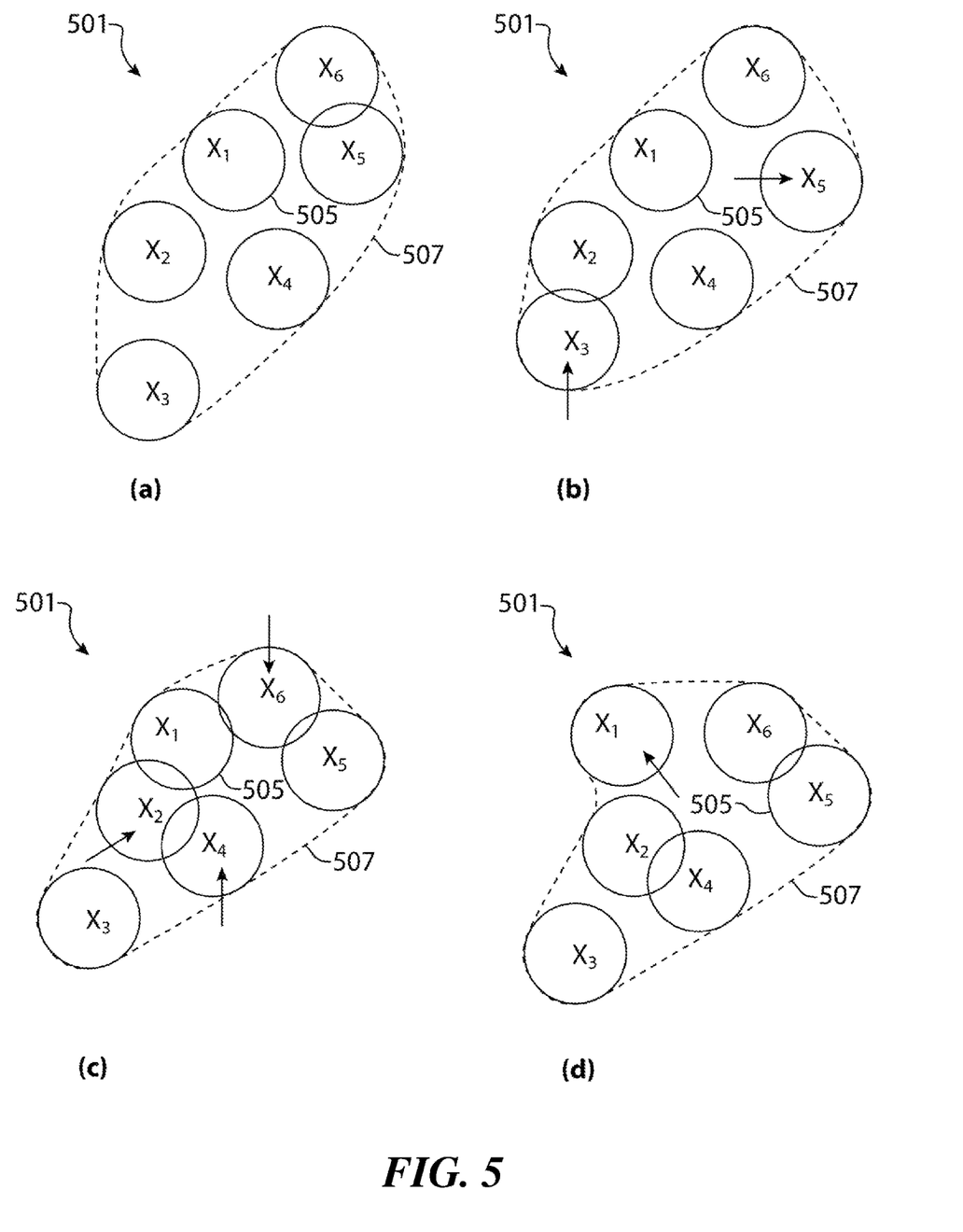
FIGS. 5a-d are illustrations depicting the morphing of a dynamic geofence of the type depicted in FIG. 4 as a function of time as the members with an entourage move about.

FIG. 4 is an illustration of another embodiment of a system 401 for utilizing a dynamic geofence to create a zone which adapts to continuously encompass an entourage of members 405. The geofence 407 in this particular embodiment has a shape which may change as a function of time, and which is determined by the locations of the members of the entourage. For example, the geofence 407 may be defined with reference to the shortest straight-line distances between members, which may be established, for example, through a least squares analysis. In some instances, the geofence 407 may be defined or established with reference to the members of an entourage who are farthest from each other or from a suitable reference point at a particular point in time.

The system 501 in FIGS. 5a-d illustrates the possible evolution of a geofence 507 as a function of time as the members 505 of an entourage move around. As seen therein, the shape of the geofence 507 in this embodiment continuously morphs to ensure that all members of the entourage are encompassed by the geofence. In the embodiment depicted, the geofence has a "tight" configuration (that is, the size of the geofence is at least partially minimized, subject to constraints). However, in some embodiments, the geofence may be centered about the host or a particular point, and may have a fixed shape. For example, the geofence may be centered around the middle of a line segment between the two members of the entourage who are farthest apart.

It will be appreciated that certain constraints may be placed on the range over which the radius or dimensions of the geofence can vary. Thus, for example, the radius or dimensions of a geofence may be constrained to certain minimum or maximum values. In some embodiments, the host may be notified (e.g., through a software-generated alert) if the radius or dimensions of a geofence are approaching a certain threshold value.

It will also be appreciated that an entourage may change as a function of time, not only in shape, size or dimensions, but in the number of members contained in it. For example, members may be readily added to, or subtracted from, an entourage, and the geofence may be adjusted correspondingly.

Various substitutions and modifications are possible with the systems, methodologies and software described herein. For example, the software used to implement these systems and methodologies may take a variety of forms, and may be distributed to varying degrees among mobile technology platforms and servers. This includes embodiments in which no servers are utilized for some or all of the functions of the software, and embodiments in which servers are utilized only for specific functions (such as, for example, determining whether captured media was within a particular geofence at the time of its capture). Thus, for example, the software may be implemented in forms in which most or all of the heavy computational tasks are performed by a backend server, or in forms most or all of these tasks are performed by the mobile technology platforms.

The software which may be utilized to implement the systems and methodologies disclosed herein may be comprise suitable programming instructions which are disposed in a tangible, non-transient medium and, which, when executed by one or more processors, performs the methodologies or implements the systems described herein.

Moreover, the roaming geofence or exclusion zones described herein may be established in a variety of ways. In some embodiments, the boundaries of a geofence or exclusion zone may be periodically determined by the mobile technology platform itself, possibly in conjunction with the software described herein and/or an operating system which is partially or wholly resident on the mobile technology platform.

In other embodiments, the boundaries of a geofence or exclusion zone may be periodically determined by one or more servers or other devices external to a mobile technology platform. In such embodiments, the boundaries of a geofence or exclusion zone may be periodically transmitted to the mobile technology platform, or may be stored on the external device (or devices) for use in determining whether captured media should be associated with the geofence.

In some embodiments, the boundaries of a geofence or exclusion zone may only be ascertained at the time at which a determination is being made as to whether a particular instance of media is to be associated with the geofence. In some cases, such a determination may be made after the fact (for example, this determination may occur after the mobile technology platform used to capture the media is no longer within the geofence).

One skilled in the art will appreciate that the geofences and exclusion zones described herein may be treated independently or in combination in the systems and methodologies described herein. For example, in some embodiments, the geofence around a target may be defined exclusive of the exclusion zone, so that media captured within the exclusion zone is treated as having been captured outside of the geofence. In other embodiments, as noted above, media capture within the exclusion zone may be precluded or restricted. For example, in some embodiments, sharing of media captured within an exclusion zone may be subject to the approval of a party managing the exclusion zone, which may be, for example, the person associated with a mobile technology platform with respect to which a geofence is defined.

While the systems, methodologies and software disclosed herein have frequently been described with reference to the use of a mobile technology platform to establish a geofence around an associated party, one skilled in the art will appreciate that these systems, methodologies and software may be readily adapted to the use of other means and devices for establishing a geofence.

Thus, for example, in some embodiments, a vehicle (which may be, for example, a car; a truck; a bus; a boat, a ship, or other watercraft; or an airliner or other aircraft) may be equipped with suitable software and hardware to enable a geofence to be established around it. Hence, with obvious modifications, such a vehicle may be substituted for one or more mobile technology platforms in the systems, methodologies and software disclosed herein. By way of example, in such an embodiment, an entourage may consist of two automobiles and five individuals, and the geofence may be established through use of mobile technology platforms associated with each of the individuals and the hardware and software (plus any operating systems) associated with each of the automobiles.

As a further example, a cruise ship and some or all of the passengers of the cruise ship may form an entourage, in which case the cruise ship may act as the host of the entourage. The dynamic geofence established may then encompass the cruise ship as well as the passengers, thus allowing captured media to be readily shared among the passengers and/or with the cruise line.

In some embodiments of the systems and methodologies disclosed herein which deal with dynamic geofences established around a group containing a plurality of members, a particular member may be designated as a host. The host may be given the ability to define or adjust various aspects or parameters of the geofence or exclusion zone including, for example, the minimum or maximum acceptable dimensions or radius of the geofence or exclusion zone, the status of the exclusion zone (on or off), or the like. The host may also be sent notifications or alerts. For example, the host may receive a notification if a member of the group moves beyond a certain threshold distance from, for example, the host or the member located farthest from that member.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims. In these claims, it will be appreciated that the elements set forth in the claims may be combined in various combinations and sub-combinations. By way of illustration, and unless otherwise precluded by the claim language, the elements found in two or more dependent claims may be combined into a single dependent or independent claim, whether or not the dependent claims are dependent from each other, without departing from the scope of the present invention.

What is claimed is:

1. A method for processing media associated with a target having a dynamic geofence associated with it, the method comprising:
   providing a software application, an instance of which is installed on a memory device on each of a plurality of mobile technology platforms associated with a plurality of users;
   receiving a request to at least one of associate captured media with the target or attribute the captured media to one of said plurality of users;
   determining whether the media was captured within the dynamic geofence associated with the target; and
   if the media was captured within the dynamic geofence associated with the target, then granting the request, and otherwise denying the request;
   wherein a boundary of the dynamic geofence is determined based on the location of a plurality of members at a particular time,
   wherein each member of the plurality of members is at least one of a user, a place, or a thing,
   wherein a location of at least one member of the plurality of members changes over time,
   wherein the boundary of the dynamic geofence is adjusted (a) periodically, or (b) when it is determined that at least one member has moved by an amount which exceeds a predetermined threshold amount,
   wherein the captured media has metadata associated with it, and wherein determining whether the media was captured within the dynamic geofence includes determining the time at which the media was captured, and determining the location of the dynamic geofence at the time the media was captured, and
   wherein the request comes from a first mobile technology platform having a first instance of the software application thereon, and wherein determining whether the media was captured within the dynamic geofence is performed after the first mobile technology platform has exited the dynamic geofence associated with the target.

2. The method of claim 1, wherein the dynamic geofence has an exclusion zone associated with it, and wherein the request is granted if the media was captured within the dynamic geofence and outside of the exclusion zone, and is otherwise denied.

3. The method of claim 2, wherein the exclusion zone is a zone within the dynamic geofence that has a smaller area than the area enclosed by the boundary of the dynamic geofence.

4. The method of claim 2, wherein the exclusion zone may be turned on and off.

5. The method of claim 1, wherein the dynamic geofence has a fixed shape.

6. The method of claim 1, wherein a shape of the dynamic geofence changes with time.

7. The method of claim 1, wherein the boundary of the dynamic geofence is determined to encompass each member of the plurality of members.

8. The method of claim 1, wherein the dynamic geofence remains centered around at least one of a particular member or a particular location over time.

9. The method of claim 1, wherein the dynamic geofence is constrained to have at least one of a predetermined maximum size or a predetermined minimum size.

10. The method of claim 1, further comprising:
    determining privacy settings associated with the media; and
    making the media available to at least one user of the plurality of users who is not excluded by the privacy settings.

11. The method of claim 10, wherein making the media available to at least one user of the plurality of users who is not excluded by the privacy settings includes posting the media to a website associated with the target.

12. The method of claim 1, wherein the target is a person.

13. The method of claim 1, wherein the target is an object.

14. The method of claim 1, wherein the target is an event.

15. The method of claim 1, wherein determining whether the media was captured within the dynamic geofence includes determining whether the first mobile technology platform is within the dynamic geofence associated with the target.

16. The method of claim 1, wherein determining whether the media was captured within the dynamic geofence includes determining whether the first mobile technology platform has entered the dynamic geofence associated with the target.

17. The method of claim 1, wherein the target is a member of the plurality of members, and a location of the target changes over time.

18. A system for processing media associated with a target having a dynamic geofence associated with it, the system comprising:
- a software application, an instance of which is installed on each of a plurality of mobile technology platforms associated with a plurality of users; and
- at least one server configured to:
  - receive a request from an instance of the software to at least one of associate media captured on the plurality of mobile technology platforms with the target or attribute said captured media with at least one of said plurality of users,
  - determine whether the captured media was captured within the dynamic geofence associated with the target, and
  - if the media was captured within the dynamic geofence associated with the target, grant the request, and otherwise deny the request;
- wherein the dynamic geofence is determined based on the location of a plurality of members at a particular time,
- wherein each member of the plurality of members is at least one of a user, a place, a thing, or the target,
- wherein a location of at least one member of the plurality of members changes over time,
- wherein the geofence is altered (a) periodically, or (b) when it is determined that at least one member of the plurality of members has moved by an amount which exceeds a predetermined threshold amount,
- wherein the captured media has metadata associated with it, and wherein determining whether the media was captured within the dynamic geofence includes determining the time at which the media was captured, and determining the location of the dynamic geofence at the time the media was captured, and
- wherein the request is received from a first mobile technology platform having a first instance of the software application thereon, and wherein determining whether the media was captured within the dynamic geofence is performed after the first mobile technology platform has exited the dynamic geofence associated with the target.

* * * * *